United States Patent [19]

Sezai

[11] Patent Number: 5,548,290
[45] Date of Patent: Aug. 20, 1996

[54] METHOD OF DESIGNING TRANSMISSION POWER IN SYNTHETIC APERTURE RADAR

[75] Inventor: Toshihiro Sezai, Tokyo, Japan

[73] Assignee: National Space Development Agency of Japan, Tokyo, Japan

[21] Appl. No.: 401,437

[22] Filed: Mar. 9, 1995

[30] Foreign Application Priority Data

Mar. 23, 1994 [JP] Japan .................................. 6-75479

[51] Int. Cl.⁶ .................................................. G01S 13/90
[52] U.S. Cl. ................................................... 342/25
[58] Field of Search ......................................... 342/25

[56] References Cited

PUBLICATIONS

IGARSS' 94 International Geoscience and Remote Sensing Symposium, vol. 1, Aug. 1994, California Institute of Technology Pasadena California US pp. 298–300. R. Keith Raney et al 'Comments on SAR signal and noise equations' *the whole document*.

Proceedings of the IEEE, vol. 79, No. 6, Jun. 1991, New York US pp. 800–809. Yoshiaki Nemoto et al 'Japanese earth resources satellite-1 synthetic aperture radar'. *the whole document*.

*Primary Examiner*—John B. Sotomayor
*Attorney, Agent, or Firm*—Armstrong, Westerman, Hattori, McCleland & Naughton

[57] ABSTRACT

In a method of designing the transmission power of a synthetic aperture radar installed on a flight object such as an artificial satellite, the transmission power is designed such that, in applying radar equation $P_r = P_t \cdot \sigma \cdot A_p^2 / (4\pi\lambda^2 R^4)$ [$P_t$: transmission power (W), $\sigma$: radar scattering cross section (m²), $A_p$: antenna area (m²), R: distance to the object to be observed (m), $\lambda$: wavelength of radio wave (m)] for setting transmission power $P_r$ so as to satisfy the conditions required for the radar, the radar scattering cross section $\sigma$ is set to $\sigma = \sigma^0 \cdot S^2 \cdot 4\pi / \lambda^2$ [$\sigma^0$: scattering coefficient, S: area of irradiated domain (m²)].

1 Claim, 2 Drawing Sheets

METHOD OF DESIGNING TRANSMISSION POWER IN SYNTHETIC APERTURE RADAR

BACKGROUND OF THE INVENTION

The present invention relates to a method of designing transmission power of a synthetic aperture radar capable of greatly reducing the transmission power in the synthetic aperture radar.

In synthetic aperture radars, as known in the art, an antenna having a virtually large aperture is formed using an antenna having rather small aperture. In this technique, an image radar (side-looking radar) is installed on a flight object (platform) such as an artificial satellite or an air craft, and an radio wave is emitted by the image radar, as the flight object is moving, toward the ground in a lateral direction relative to the flight object. The image radar receives reflected radio waves as it moves, and performs synthetic aperture processing on the received radio waves in such a manner that an image equivalent to that obtained via a large-aperture antenna can be obtained. Such a synthetic aperture radar is used as an image sensor that can provide a high-resolution image under all-weather conditions.

FIG. 1 is a schematic diagram illustrating the construction of a typical synthetic aperture radar. In FIG. 1, there are shown a flight object (platform) 11 such as an artificial satellite or an aircraft, a transmitter 12 installed on this flight object, a receiver 13, a duplexer 14, a reception radio wave decoder 15 for recording radio waves received via the receiver 13, and an antenna 16.

Referring to FIG. 2, the operation principle of the synthetic aperture radar constructed with these elements will be described below. The flight object 11 such as an artificial satellite travels at a speed V along an air route or orbit L predetermined depending on a specific purpose. The small-aperture antenna 16 of the synthetic aperture radar installed on the flight object 11 emits transmission radio wave pulses at constant time intervals $t_0$ at positions $A_0, A_1, A_2, \ldots$ along the orbit L at a height h. The transmission radio wave pulse in the form of a beam with a width $\beta$ is emitted in a direction perpendicular to the orbit L, and it strikes for example an area BCED on the ground at a point $A_1$. The transmission radio wave pulse is reflected from the ground, travels backward as a reflected wave (radar echo), and is finally received by the same antenna 16.

Reflected waves are received one after another during the flight object 11 moving at the speed V thereby observing a ground area between parallel lines 1 and 1' a distance BC apart and thus recording, in the reception radio wave recorder 15, amplitude information as well as phase information contained in the received signal obtained at each temporal point. If a transmission pulse wave, that was emitted by the flight object 11 when it was for example at the point $A_0$, has arrived at a target point P to be detected, then the irradiation of the pulse wave to the target point P starts and the target point P will receive further radiation until it finally receives a pulse wave emitted by the flight object 11 at the point $A_2$. The radio waves reflected from the target point P during this period are received by the flight object 11. The received radio waves include phase information corresponding to the relative velocity that varies continuously as well as distance information. The received signals are recorded and subjected later to batch processing (holographic processing or synthetic aperture processing) whereby the antenna can act as if it has a great aperture diameter equal to the distance between points $A_0$ and $A_2$ (synthetic aperture method).

As described above, signals are received successively at various points and recorded. The received signals are then synthesized such that the antenna can detect a target as if it has a great aperture size a few ten to few ten thousand times the actual aperture size of the antenna. This means that the synthetic aperture radar can have high azimuth resolution and thus can provide a clear image that would be obtained via the equivalent large-aperture antenna.

In conventional designing of transmission power to be output from the transmitter of such a synthetic aperture radar, an radar equation used in ordinary pulse radars is used without any modification. The transmission power is designed such that the reception power satisfies the conditions required for the radar.

The conventionally used radar equation will be described below. Supposing that an radio wave of transmission power $P_t$ is isotropically radiated from the transmit antenna, a power density $P_d$ at a position separated by a distance R may be expressed as:

$$P_d = P_t / (4\pi R^2) \qquad (1)$$

By setting $G_t$ as gain of the transmit antenna (gain for isotropic antenna), a power density $P_d'$ in the antenna beam direction may be expressed as:

$$P_d' = P_t \cdot G_t / (4\pi R^2) \qquad (2)$$

When an radio wave with such power density is absorbed in a scattering object having an area S, a received power $P_{sr}$ by the scattering object may be expressed as:

$$P_{sr} = P_t \cdot G_t \cdot S / (4\pi R^2) \qquad (3)$$

A proportion of power received by the scattering object is radiated again. Such proportion is referred to as scattering coefficient $\sigma^0$, and thus the re-radiated power $P_{st}$ is expressed as:

$$P_{st} = P_t \cdot G_t \cdot S \cdot \sigma^0 / (4\pi R^2) \qquad (4)$$

Assuming that the power $P_{st}$ re-radiated from the above scattering object has been isotropically radiated, a power density $P_{rd}$ to be received at the position of the transmit antenna is expressed as:

$$P_{rd} = P_t \cdot G_t \cdot S \cdot \sigma^0 / (4\pi R^2) \qquad (5)$$

Here, if the area of the transmit antenna is $A_p$, a power $P_r$ received by the transmit antenna is expressed as:

$$P_r = P_t \cdot G_t \cdot S \cdot \sigma^0 \cdot A_p / (4\pi R^2)^2 \qquad (6)$$

Further, a relation as shown in the following equation (7) exists between the antenna area $A_p$ and the antenna gain $G_t$:

$$G_t = 4\pi A_p / \lambda^2 \qquad (7)$$

By substituting equation (7) into equation (6), the following equation (8) may be obtained:

$$P_r = P_t \cdot \sigma^0 \cdot S \cdot A_p^2 / (4\pi \lambda^2 R^4) \qquad (8)$$

Here, by replacing $\lambda^0 \cdot S$ with a scattering cross section $\sigma$ the following equation (9) may be obtained:

$$P_r = P_t \cdot \sigma \cdot A_p^2 / (4\pi \lambda^2 R^4) \text{ where } \sigma = \sigma^0 \cdot S \qquad (9)$$

This equation (9) constitutes an ordinary radar equation which is conventionally used.

The above radar equation is derived from an assumption, as described, that a scattering object isotropically scatters radio waves. Since, usually, a radar is used to determine an object (mostly discrete object) of which the nature is completely unknown based on scattered radio waves therefrom, the assumption is made that power re-radiated from the object is isotropically radiated. In a sense, an objective determination is made based on such standard for judgment.

In synthetic aperture radars, however, a radio wave is irradiated over a wide range so as to observe a domain extended in a plane. In this case, the scattering of radio waves from a planar object to be observed is no longer isotropic. In theory, thus, the radar equation for an ordinary pulse radar without any modification cannot be used for a synthetic aperture radar. Therefore, in designing the transmission power of a synthetic aperture radar, the transmission power is not correctly designed with the conventional designing method using the unmodified conventional radar equation which is based on the assumption that the power re-radiated from the scattering object is isotropically radiated. The designed transmission power is much larger than what is needed.

With an increased transmission power, the amplification degree of an amplifier must be greater. In addition, it is accompanied by various disadvantages such as a larger calorific value, an occurrence of discharge phenomenon in a transmission line, etc.

SUMMARY OF THE INVENTION

To eliminate the above problems in the conventional method of designing transmission power in synthetic aperture radars, it is an object of the present invention to provide a method of designing the transmission power in a synthetic aperture radar, in which an object to be observed in a plane is treated accurately with respect to electromagnetic fields so as to significantly simplify the radar construction by greatly reducing the transmission power.

To solve the above problems, a method of designing the transmission power in a synthetic aperture radar installed on a flight object such as an artificial satellite is provided in accordance with the present invention, wherein the transmission power is designed such that, in applying radar equation $P_r=P_t \cdot \sigma \cdot A_p^2/(4\pi\lambda^2 R^4)$ [$P_t$:transmission power (W), $\sigma$:radar scattering cross section (m$^2$), $A_p$:antenna area (m$^2$), R:distance to the object to be observed (m), $\lambda$:wavelength of radio wave (m)] for setting transmission power $P_r$ so as to satisfy the conditions required for the radar, the radar scattering cross section $\sigma$ is set to $\sigma=\sigma^0 \cdot 4\pi/\lambda^2$ [$\sigma^0$: scattering coefficient, S:area of irradiated domain (m$^2$)].

If, in a synthetic aperture radar, the transmission power is set by applying the unmodified radar equation for a conventional pulse radar based on the assumption that the power re-radiated from the object to be observed is isotropically radiated, since an radio wave is irradiated into a wide range from the synthetic aperture radar and a domain having a planar extension is subjected to observation and scattering of radio waves from such planar object to be observed is not regarded as isotropic, an extremely large reception power results.

One of the conditions required for a synthetic aperture radar is S/N (ratio of reception power to internal noise generated at the receiver). In the designing method using the conventional radar equation, an extremely large value is obtained as an actual S/N with respect to a transmission power which has been set so as to satisfy S/N in terms of the reception power on the basis of the isotropic re-radiation. An excessive transmission power has been designed in the conventional method.

Since, in a synthetic aperture radar, radio wave is irradiated in a wide range as described so as to observe a domain extended in a plane, the scattering of radio waves from the plane of object to be observed is no longer isotropic. When the nature of an object to be observed by a synthetic aperture radar is considered in this manner to accurately grasp it in terms of electromagnetic fields, the domain of the observation object irradiated by the radio wave may be treated as an antenna. In this case, assuming the gain thereof as G, the power density $P_{rd}$ to be received at the position of the transmit antenna is represented by the following formula (10), and reception power $P_r$ is represented by the following formula (11).

$$P_{rd}=P_t \cdot G_t \cdot S \cdot \sigma^0 \cdot G/(4\pi R^2)^2 \tag{10}$$

$$P_r=P_t \cdot G_t \cdot S \cdot \sigma^0 \cdot G \cdot A_p/(4\pi R^2)^2 \tag{11}$$

Here, the relation of equation (7) between antenna area and antenna gain and the following equation (12) obtained from the equation (7) are substituted into the above equation (11) to derive the following equation (13).

$$G=4\pi S/\lambda^2 \tag{12}$$

$$P_r=P_t \cdot \sigma \cdot A_p^2/(4\pi\lambda^2 R^4) \text{ where } \sigma=\sigma^0 \cdot 4\pi/\lambda^2 \tag{13}$$

This equation (13) constitutes the radar equation employed in the present invention which considers the nature of an object to be observed.

As described, the radar scattering cross section $\sigma$ in the radar equation, which has conventionally been set to $\sigma^0 \cdot S$ is set to $\sigma^0 \cdot S^2 \cdot 4\pi/\lambda^2$ according to the present invention so that it correctly corresponds to a synthetic aperture radar. Based on this, a transmission power is obtained. By setting the transmission power in this manner, the transmission power may be brought to one of $\lambda^2/(S \cdot 4\pi)$ parts of that in the conventional system. Simplification such as of an amplifier in the radar construction may be achieved while well satisfying the conditions such as S/N which are required for a synthetic aperture radar.

EMBODIMENT

Figure 1:
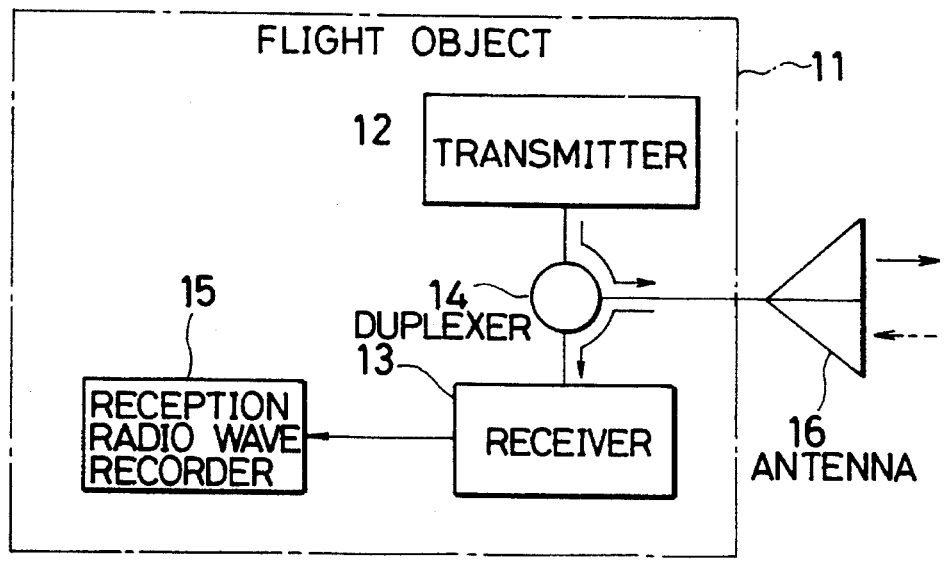
FIG. 1 schematically shows the construction of a typical synthetic aperture radar.
Figure 2:
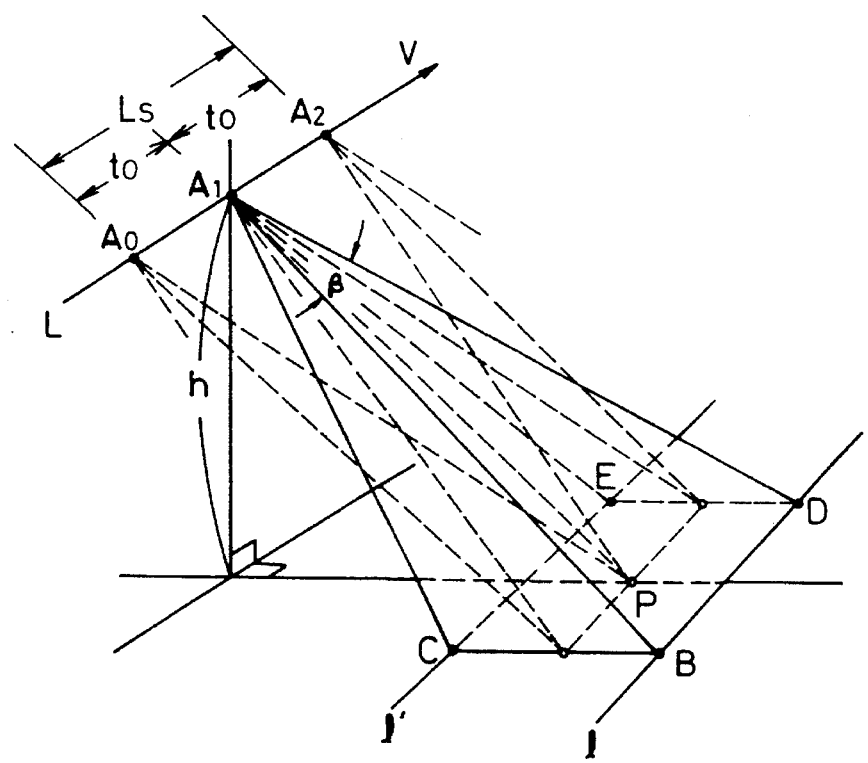
FIG. 2 illustrates the operation principle of the synthetic aperture radar shown in FIG. 1.
Figure 3:
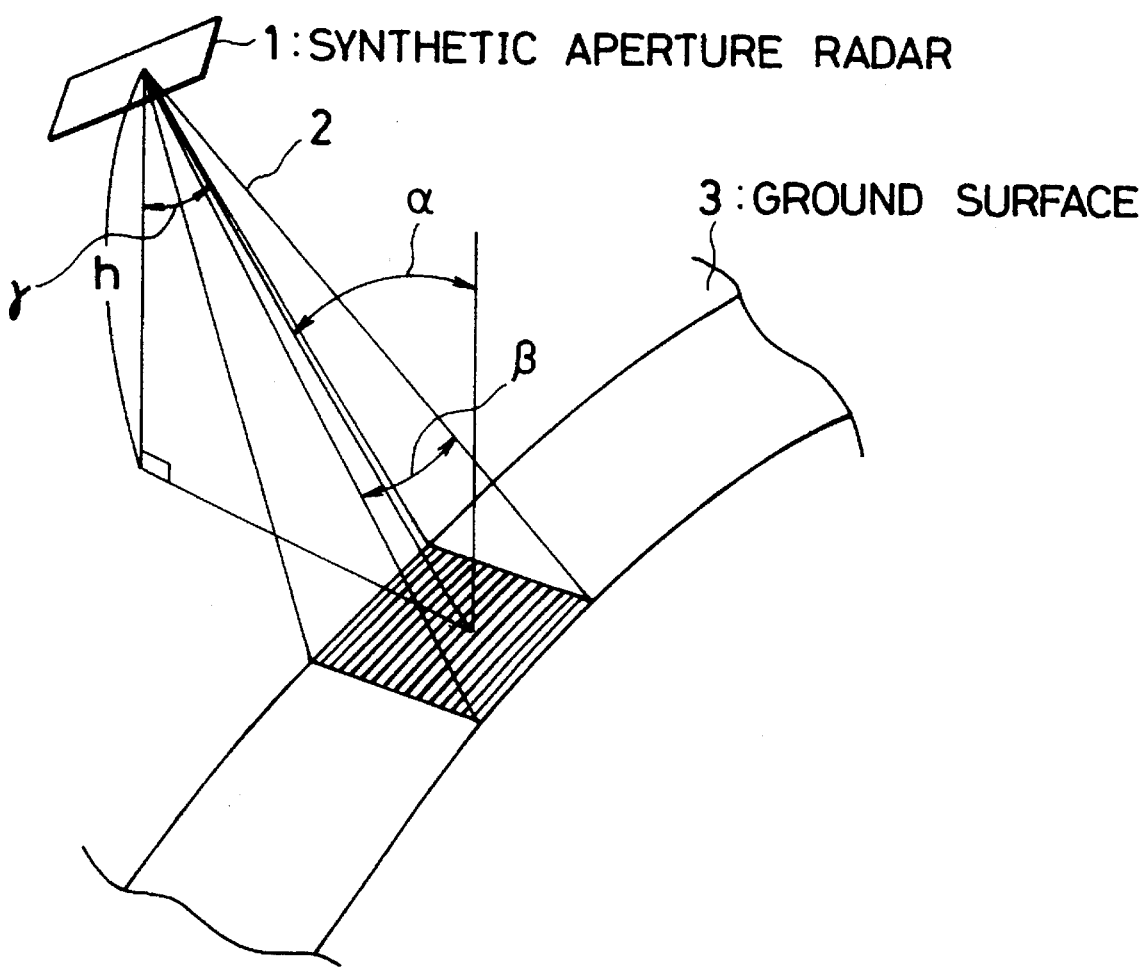
FIG. 3 illustrates an example of the method of designing the transmission power in a synthetic aperture radar according to the present invention.

An embodiment will be described below. FIG. 3 illustrates a transmitting irradiation mode of pulse radio wave based on the specification of a synthetic aperture radar installed on artificial satellite J. ERS-1 which was launched on February 1992. A radio wave 2 transmitted from a synthetic aperture radar 1 has a pulse width of 35 μsec, a wavelength of 0.235 m, an antenna beam width in the travelling direction ($\beta$) of 1.05°. Orbital altitude (h) of the artificial satellite is 570 km, angle ($\alpha$) of incidence with respect to the ground surface is 38° and off-nadir angle ($\gamma$) is 35°. Therefore, the domain in which the surface ground 3 is irradiated by an actually transmitted pulse wave has an extent of 13,045 m in the traveling direction of the synthetic aperture radar 1, and the extent in the direction orthogonal to the traveling direction is 8,527 m which corresponds to resolution based on the pulse width of the pulse radio wave, resulting in an area of 111,234,715 m².

In the synthetic aperture radar having such specification, a peak output of 1.3 kW for the transmission power has been set by using the unmodified radar equation where $\sigma=\sigma^0 \cdot S$ according to the conventional method. This transmission power, however, has been designed as described on the basis of a reception power set on the assumption that, in a synthetic aperture radar, too, power is re-radiated isotropically from the object to be observed. Such design is excessive as it is based on an incorrect criterion.

In the present invention, the radar scattering cross section $\sigma$ which has conventionally been set to $\sigma^0 \cdot S$ is set to $\sigma^0 \cdot S^2 \cdot 4\pi/\lambda^2$. The ratio of the conventional radar scattering cross section $\sigma$ to that of the present invention is $\sigma^0 \cdot S : \sigma^0 \cdot S^2 \cdot 4\pi/\lambda^2 = 1 : S \cdot 4\pi/\lambda^2$. Since, in this example, S is 111,234,715 m² and $\lambda$ is 0.235 m, the radar scattering cross section according to the present invention is about $2.531 \times 10^{10}$ times that of the conventional system. Accordingly, a transmission power $P_t$ that is $1/2.531 \times 10^{10}$ of the conventional system suffices if the object to be observed constitutes a perfect plane. In practice, however, an object to be observed is not in a complete plane and a large number of irregularities such as mountains and valleys exist. Since phases do not match, the actual transmission power in a conservative estimate is one of several parts of that in the conventional system.

This is technologically backed up by the following facts. That is, the synthetic aperture radar installed on artificial satellite J. ERS-1 shown in the above example is unable to perform a high-power mode transmission at a peak output of 1.3 kW due to discharge phenomenon, and only a low-power mode transmission at 300 W is performed. Thus, a deterioration of 6 dB or more has been caused in terms of S/N. Images by the low-power mode transmission, however, is obtained with a significantly higher S/N than that originally expected for the high-power mode transmission of peak power.

As has been described by way of an embodiment, the transmission power in a synthetic aperture radar may be significantly reduced according to the present invention. It is thus possible to achieve a simplification in the radar construction.

I claim:

1. A method of designing transmission power in a synthetic aperture radar installed on a flight object such as an artificial satellite, the method of designing transmission power in a synthetic aperture radar comprising the steps of:

designing a required transmission power for the synthetic aperture radar by using a radar equation $$P_r = P_t \cdot \sigma \cdot A_p^2 / (4\pi \lambda^2 R^4),$$

[$P_t$: transmission power (W), $\sigma$: radar scattering cross section (m²), $A_p$: antenna area (m²), R: distance to an object to be observed (m), $\lambda$: wavelength of radio wave (m)] wherein $P_t$ represents transmission power, $\sigma$ represents radar scattering cross section, $A_p$ represents antenna area, R represents distance to an object to be observed, and $\lambda$ represents a wavelength of a radio wave, for setting the transmission power $P_r$ so as to satisfy conditions required for the radar, and wherein the radar scattering cross section $\sigma$ is set such that $\sigma = \sigma^0 \cdot S^2 \cdot 4\pi/\lambda^2$, wherein $\sigma^0$ represents a scattering coefficient, and S represents an area of an irradiated domain [$\sigma^0$: scattering coefficient, S: area of irradiated domain (m²)].

* * * * *